United States Patent
Homann et al.

(10) Patent No.: US 9,262,825 B2
(45) Date of Patent: Feb. 16, 2016

(54) IMAGE RECONSTRUCTION IN INTERLEAVED MULTI-ENERGY IMAGING

(71) Applicant: KONINKLIJKE PHILIPS N.V., Eindhoven (NL)

(72) Inventors: Hanno Heyke Homann, Hamburg (DE); Roland Proksa, Neu Wulmstorf (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/407,971

(22) PCT Filed: Jun. 13, 2013

(86) PCT No.: PCT/IB2013/054847
§ 371 (c)(1),
(2) Date: Dec. 15, 2014

(87) PCT Pub. No.: WO2013/190435
PCT Pub. Date: Dec. 27, 2013

(65) Prior Publication Data
US 2015/0170358 A1    Jun. 18, 2015

Related U.S. Application Data

(60) Provisional application No. 61/662,517, filed on Jun. 21, 2012.

(51) Int. Cl.
| | |
|---|---|
| G06K 9/00 | (2006.01) |
| G06T 7/00 | (2006.01) |
| G06T 11/00 | (2006.01) |
| G06K 9/52 | (2006.01) |
| G06K 9/62 | (2006.01) |
| G06T 5/00 | (2006.01) |
| A61B 6/00 | (2006.01) |

(52) U.S. Cl.
CPC ............ *G06T 7/0012* (2013.01); *G06K 9/52* (2013.01); *G06K 9/6267* (2013.01); *G06T 5/001* (2013.01); *G06T 11/008* (2013.01); *G06T 2211/436* (2013.01)

(58) Field of Classification Search
USPC ......... 382/100, 103, 106–107, 128–134, 154, 382/162, 168, 173, 181, 199, 209, 232, 254, 382/274–276, 284–291, 305, 312; 378/4, 378/18, 21, 5, 62
See application file for complete search history.

(56) References Cited

U.S. PATENT DOCUMENTS

| | | | | |
|---|---|---|---|---|
| 7,672,421 B2* | 3/2010 | Chen | ............ | G06T 11/005 378/4 |
| 8,588,494 B2* | 11/2013 | De Man | ............ | G06T 11/008 378/18 |

(Continued)

FOREIGN PATENT DOCUMENTS

WO     2009120417 A1    10/2009

*Primary Examiner* — Seyed Azarian

(57) ABSTRACT

The present invention discloses a method for reconstructing an image obtained from kVp switched imaging of a body by acquiring a plurality of images at a first kVp defining a first image scan and a plurality of images at a second kVp defining a second image scan, wherein the plurality of images at the first kVp are acquired interleaved with the plurality of images of the second image scan and by reconstructing an image from the first and second image scan, comprising determining at least one gradient location for at least two images in the first and second image scans, determining divergent gradient locations in respect of a same part of the body for said at least two images in the first and second image scans, tagging each divergent gradient location as an under sampling artifact, generating the reconstructed image from the at least two images in the first and second image scans by correcting for each tagged under sampling artifact. The invention further discloses an imaging system for imaging at least a part of a body by means of a first image scan and a second image scan and a computer program product.

12 Claims, 5 Drawing Sheets

(56) References Cited

U.S. PATENT DOCUMENTS

| | | |
|---|---|---|
| 2004/0102688 A1 | 5/2004 | Walker et al. |
| 2009/0304149 A1* | 12/2009 | Herrmann ............ A61B 6/4233 378/62 |
| 2010/0189212 A1* | 7/2010 | Zou ....................... G06T 11/005 378/5 |
| 2011/0052022 A1* | 3/2011 | Xu ....................... G01N 23/046 382/131 |
| 2011/0085719 A1* | 4/2011 | Fan ....................... G06T 11/008 382/131 |

* cited by examiner ically to mitigating artifacts resulting from undersampling in interleaved multi-energy medical imaging acquisitions. A kVp-switched CT scanner is an example of a medical imaging system in which the present invention may be used.

IMAGE RECONSTRUCTION IN INTERLEAVED MULTI-ENERGY IMAGING

CROSS-REFERENCE TO PRIOR APPLICATIONS

This application is the U.S. National Phase application under 35 U.S.C. §371 of International Application No. PCT/IB2013/054847, filed on Jun. 13, 2013, which claims the benefit of U.S. Provisional Patent Application No. 61/662517, filed on Jun. 21, 2012. These applications are hereby incorporated by reference in their entirety herein.

BACKGROUND OF THE INVENTION

The present invention generally relates to multi-energy imaging acquisitions. While it is described with particular application to medical imaging, in particular computed tomography (CT), it also relates to other applications in which it is desirable to reconstruct images from scans of photons with different energies.

In CT a radiation source, present in a gantry that is rotatable around an examination area, emits photons, usually x-rays. A detector, generally opposite the radiation source, detects the photons after they traversed the examination area, usually to scan a body present in said examination area. In multi-energy CT the radiation source emits photons at two (or more) different energy levels, which are attenuated at different levels by different materials in the object, e.g. various organs, fluids or bones within a patient's body. Multi-energy CT is used to increase inherently weak soft-tissue contrasts in x-ray imaging and at the same time allows for reduction of beam-hardening artifacts. Among various multi-energy CT techniques (including dual source CT and use of multi-layer detectors or photon-counting detectors), a peak kilovoltage (kVp) switching technique is of particular interest, since it operates with a conventional detector.

The kVp-switching technique is based on acquisition of projections at two (or more) different anode voltages, i.e. different photon spectra. An example of kVp-switched CT may be found in U.S. patent application Ser. No. 2011/0085719A1, wherein a set of first (low kVp) image scans and a set of second image scans (high kVp) are acquired interleaved as a function of a rotation angle of the gantry. An image is reconstructed from the obtained first and second image scans.

When demanding a constant x-ray dose and scan time, angular undersampling occurs with interleaved projection sets, since these consist of fewer projections than a conventional 'complete' CT acquisition. This angular undersampling often leads to artifacts, such as streak artifacts and moiré patterns, in reconstructed images. The present invention aims at mitigating such undersampling artifacts resulting from interleaved multi-energy imaging acquisitions.

SUMMARY OF THE INVENTION

Embodiments of the present invention are directed to a method for reconstructing an image obtained from kVp switched medical imaging of a body. The method comprises acquiring a plurality of images at a first kVp defining a first image scan and a plurality of images at a second kVp defining a second image scan, wherein the plurality of images at the first kVp are acquired interleaved with the plurality of images of the second image scan. An image is reconstructed image from the first and second image scan by determining at least one gradient location for at least two images in the first and second image scans, determining divergent gradient locations in respect of a same part of the body for said at least two images in the first and second image scans, tagging each divergent gradient location as an undersampling artifact and generating the reconstructed image from the at least two images in the first and second image scans by correcting for each tagged undersampling artifact. As a result, undersampling artifacts are significantly or even completely removed and a more reliable and better quality image is obtained.

Another embodiment of the present invention is directed towards a medical imaging system for imaging at least a part of a body by means of a first image scan and a second image scan. The system includes a kVp-switched x-ray source generating x-rays at a first kVp and a second kVp, an x-ray detector for detecting x-rays generated at the first kVp and at the second kVp that have traversed an examination region, a data processor for causing the generation of image scans from x-rays detected by the detector, a reconstructor to generate a reconstructed image and a display unit for displaying the reconstructed image. The reconstructor reconstructs images by determining gradient locations in images of said image scans, determining divergent gradient locations between said image scans, tagging divergent gradient locations as undersampling artifacts and generating reconstructed images from said image scans by correcting for each tagged undersampling artifact. The medical system of the present invention generates images from interleaved multi-energy image scans with significantly less or even completely removed undersampling artifacts.

A further embodiment of the present invention is directed towards a computer program product comprising a set of instructions to cause a reconstructor to determine gradient locations between at least two image scans, determine divergent gradient locations between said at least two image scans, tag divergent gradient locations as undersampling artifacts and generate reconstructed images from said image scans by correcting for each tagged undersampling artifact.

Still further aspects and embodiments of the present invention will be appreciated by those of ordinary skill in the art upon reading and understanding the following detailed description. Numerous additional advantages and benefits will become apparent to those of ordinary skill in the art upon reading the following detailed description of preferred embodiments.

DETAILED DESCRIPTION OF THE EMBODIMENTS

A method, a system and a computer program product for interleaved multi-energy medical imaging with common image gradient constraints are disclosed.

Currently, many different kinds of imaging systems are used to obtain medical images. These kinds of imaging systems include CT, PET, SPECT, MRI, and other imaging systems. An exemplary CT imaging system 1 is schematically depicted illustrated in FIG. 1. The method and system disclosed herein also has application in connection with various other types of imaging systems or combinations of imaging systems between or other than the types expressly discussed herein.

Figure 1:
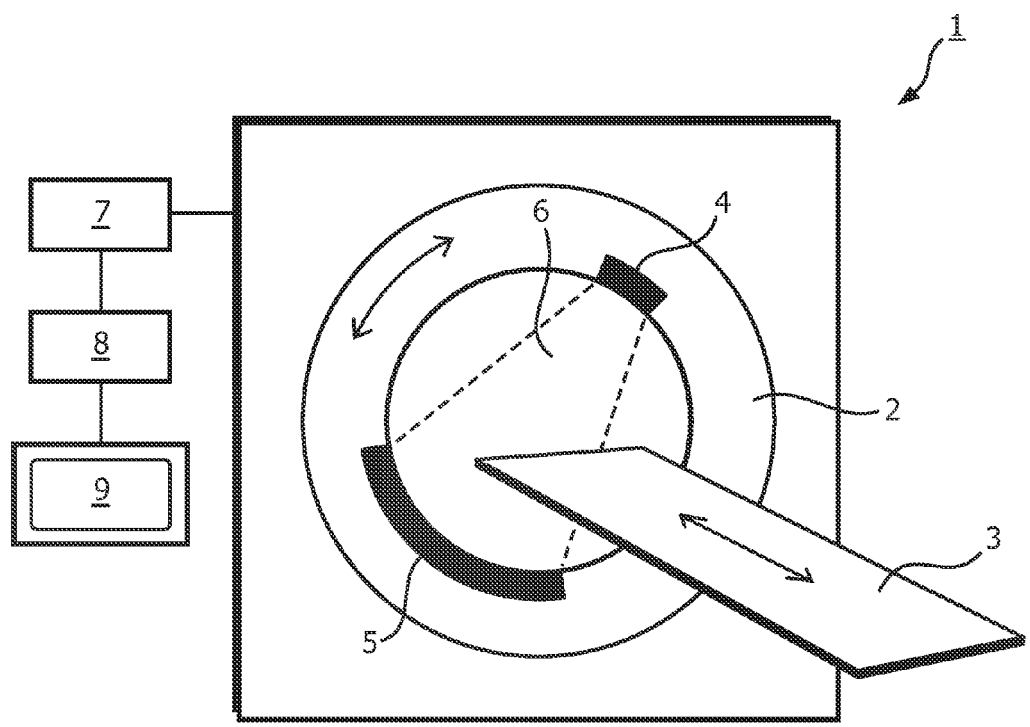
FIG. 1 shows a pictorial view of a CT imaging system.

The CT system 1 depicted in FIG. 1 comprises a gantry 2 housing an x-ray source 4 and a detector 5. The x-ray source 2 features kVp tube switching acquisition that is known in the art to sequentially emit low energy and high energy radiation. Duty cycles of different voltage settings can be identical or different (e.g. 75% of 80 kV and 25% of 140 kV, in terms of on-off-ratio or a number of projections, to compensate for a higher attenuation of a low energy spectrum). Emitted x-rays traverse an examination region 6 towards detector 5, which is a conventional x-ray detector commonly used in CT. The detector 5 detects the sequentially emitted low energy and high energy x-rays in an interleaved manner. A body, such as a patient, can be moved through the examination region 6 on movable bench 3. Gantry 2 is 360 degrees rotatable around the examination region 6 to be able to scan the body from all desired angles. The detector 5 transmits data about the detected x-rays to data processor 7 that generates image scans from the received data. These are then transmitted to reconstructor 8 where an image is reconstructed from the scans. The reconstructed image is displayed to a user on display unit 9.

Only the essential features to describe the present invention are shown and described regarding the CT system depicted in FIG. 1. A person skilled in the art would understand that an actual CT system comprises many more alternative, additionally functional or optional features not shown in FIG. 1.

With the CT system reconstruction of tomographic images can either be performed directly for two (or more) measured sets of scans or for a set of so-called "basis materials" (e.g. the photo- and the Compton effect).

The reconstructor determines a gradient location for each obtained image scan. A gradient location is defined in the context of this invention as a specific location in the image scan where the attenuation of two neighboring areas is different. The neighbouring areas may each be individual pixels or voxels or may represent larger groups of these. The gradient location typically represents so-called 'edges' between areas with lower and higher attenuation with respect to each other (e.g. between different organs or tissues within a body). Since these areas are normally in fixed position within the scanned body, these gradient locations should match exactly for image scans of a same body part that are acquired quickly after each other, such as is the case with interleaved acquisition of low and high energy acquisition.

Figure 2:
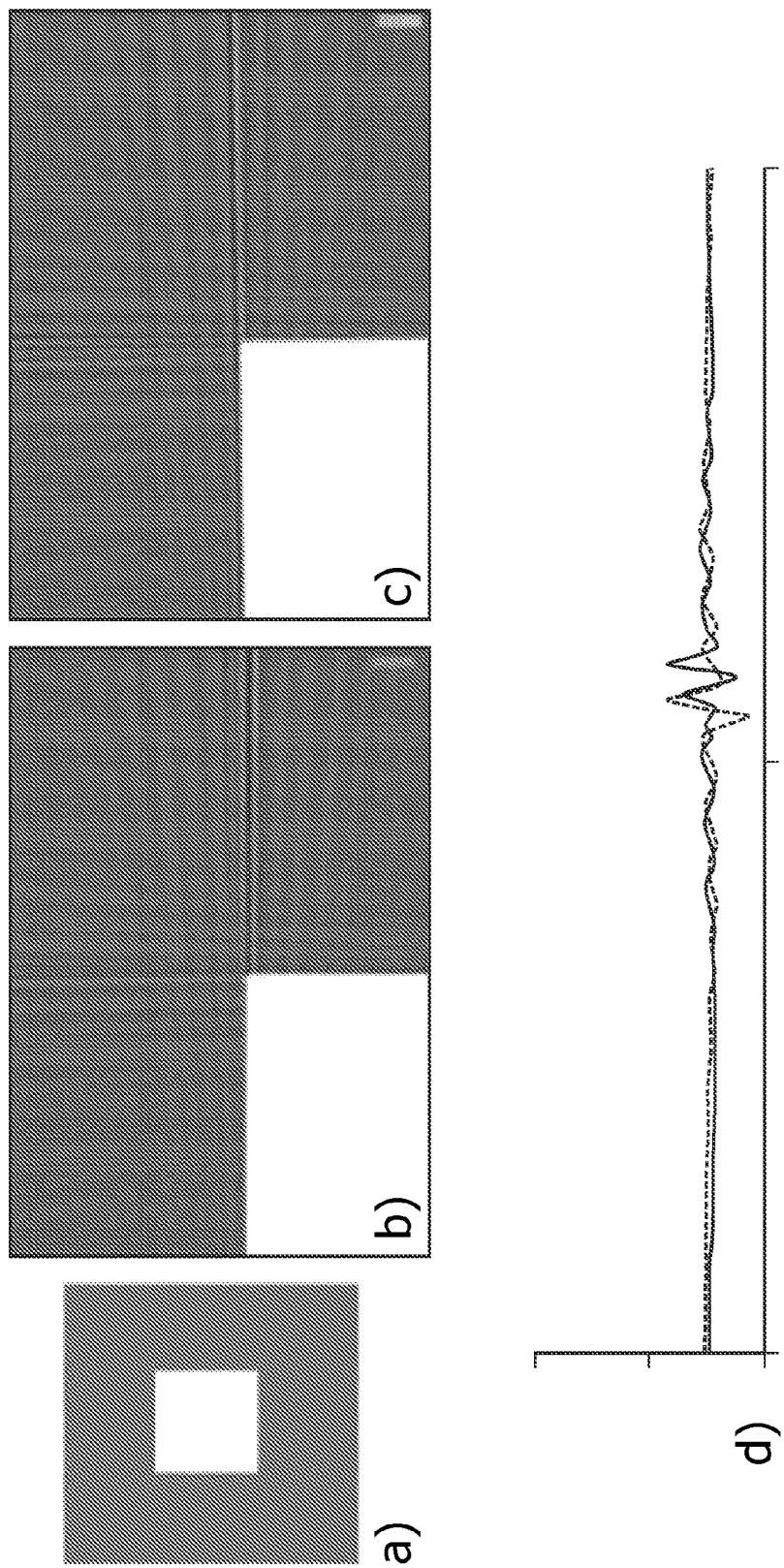
FIG. 2a-d show a simulated box phantom reconstructed according to known prior art.

However, during interleaved acquisition undersampling occurs. This results in additional gradients in the image scans that might appear as, for instance, streaks and/or as moiré patterns. Within the context of this invention these artifacts are defined as undersampling artifacts. Unlike the 'edges' the undersampling artifacts do not represent a fixed physical entity in the scanned body and therefore do not coincide spatially for subsequent scans. This is illustrated in FIG. 2, which shows a kVp-switched CT image of a simulated box phantom. FIG. 2a shows an overview of the complete simulated box phantom image. FIGS. 2b and 2c were reconstructed from two interleaved projection subsets of the same zoomed-in section of the top-right corner of FIG. 2a. These figures show more clearly that undersampling artifacts in the form of streaks and a moiré effect are present in the reconstructed images. FIG. 2d shows that streaks in FIGS. 2b and 2c do not coincide spatially for vertical profiles of the same cross-section in FIGS. 2b and 2c at the position indicated by a bar on the bottom right in these figures. This effect can even be amplified when reconstructing from basis materials (e.g. photo- and Compton-effect images) as such reconstructions rely on spectral differences between acquired projections.

The present invention is based on the insight that only matching gradient locations between two image scans of the same part of the body are most likely to represent an 'edge', while non-matching gradient locations are more likely to be undersampling artifacts. An image is reconstructed by correcting for these artifacts, resulting in an image that features fewer artifacts and therefore shows projection of the part of the body that is more close to reality and is therefore more reliable.

Figure 3A:
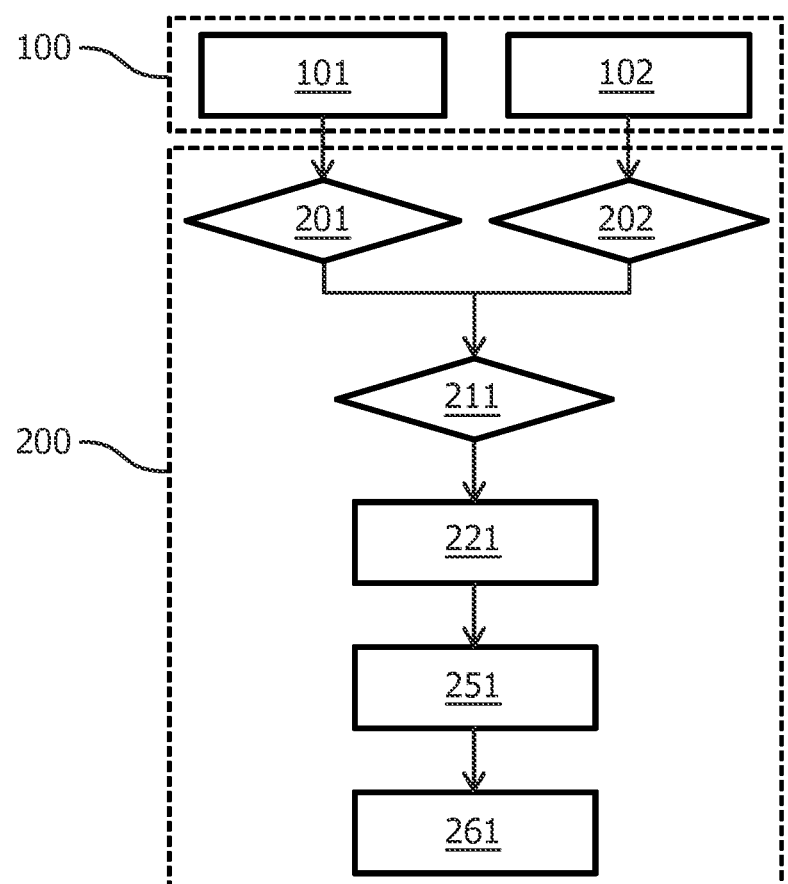
FIG. 3a-b depicts a method for reconstructing an image according to the present invention.
Figure 3B:
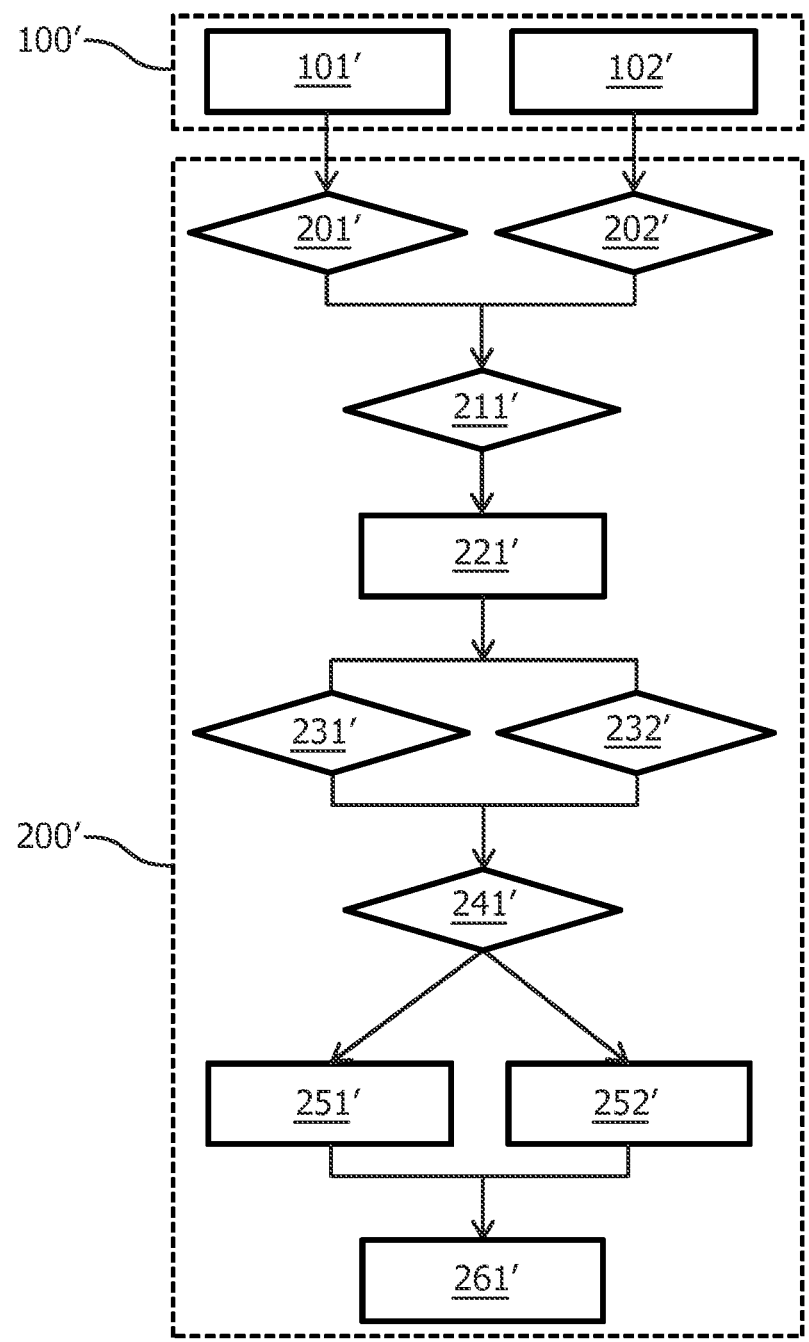

FIGS. 3a and 3b depict flow sheets of embodiments of the method for reconstructing an image obtained from kVp switched medical imaging according to the present invention.

A body is scanned with an imaging system, such as a computed tomography system, and a plurality of images is acquired (100, 100') at a first kVp (101, 101') defining a first image scan and at a second kVp (102, 102') defining a second image scan. The first and second scans are acquired in an interleaved fashion. The acquired image scans are then reconstructed (200, 200') in a reconstructor.

Gradient locations are determined for at least two images in the first (201, 201') and second (202, 202') image scans. The gradient locations for the same part of the body are compared between images from the first and second images scans and divergent gradient locations are determined (211, 211').

Comparing and matching of gradient locations is preferably performed through an iterative process where at each iteration, gradient locations in scans from the first and second image scans of the same part of the body at this iteration step are encouraged to occur at the same location. This is achieved via a suitable term in an update equation.

For example, consider a cost function C to be minimized as:

$$C=\|\hat{p}-p\|_2^2+\lambda \cdot R(I_1 I_2) \tag{1}$$

Where $\hat{p}$ describes forward projections of image $I_1$ from the first image scan and $I_2$ from the second image scan, p denotes measured projections, R is a penalty function, and $\lambda$ is a regularization parameter. The $\|\hat{p}-p\|_2^2$ demands data consistency and penalty function R encourages the gradients of both images to occur at the same location. In a simple implementation, R is defined as:

$$R(I_1, I_2):=\|DI_1-DI_2\|_1$$

$$DI_i:=\nabla I_i/|I_i|\text{(for all components of the gradient vector)} \tag{2}$$

This particular implementation in equation (2) demands that the gradient locations of the images $I_1$ and $I_2$ not only occur at the same locations, but also have a same (normalized) amplitude. In certain cases it might be advantageous to not only determine divergent gradient locations, but to also determine gradient amplitudes (231', 232') between images of the same part of the body from different image scans and determine divergent gradient amplitudes (241') as an additional condition to determine whether a gradient is an undersampling artifact or not.

In general additionally comparing gradient amplitudes leads to even better discrimination between gradient locations caused by 'edges' and gradient locations caused by undersampling artifacts. However, this 'same amplitude demand' might be too restrictive in some cases (e.g. if only one of the images has a structural edge at a certain location). In those cases use of only the 'gradient location demand' would result in better reconstruction results.

When a divergent gradient location is determined, said gradient location is tagged as an undersampling artifact (221'). If a choice is made to also compare gradient amplitudes it is particularly advantageous to only determine gradient amplitudes (231', 232') for tagged divergent gradient locations instead of determining these for the whole image or for all gradient locations, since this severely reduces computational effort.

If no gradient amplitudes were determined (FIG. 3a) the reconstructor generates a reconstructed image (261) from images in the first and second image scan by correcting (251) for each tagged undersampling artifact, e.g. by ignoring this information, by interpolating from surrounding areas or other correction techniques known in the art.

In the case where gradient amplitudes were determined (FIG. 3b) and divergent gradients were determined for the divergent gradient locations two options are available. When there are no divergent gradient amplitudes for a particular divergent gradient location, that gradient location is untagged (252') as an undersampling artifact and will not be corrected for in the step of generating a reconstructed image (261'). In case the gradient location and the corresponding gradient amplitude are both divergent, that particular gradient location will remain tagged as an undersampling artifact and a reconstructed image (261') is generated by correcting (251') for each tagged undersampling artifact.

More advanced implementations might result in further optimization of the discrimination in the iterative process to determine and match gradient locations and amplitudes, for example, use of a common hyper-prior which defines local probability of an edge in context of compressed sensing with common wavelet coefficients or as applied for some multi-contrast MRI images. Thusly, an even better discrimination between "edges" undersampling artifacts may be achieved.

The iterative process is not only suitable for use for matching gradient locations (and optionally gradient amplitudes) for two scans, but could easily be adapted to account for matching between three (or even more) scans, e.g. when switching was done at a third (or more) kVp levels or if there are more than two images available for the same body part. In this case an even better indication may be obtained to determine whether a gradient location is caused by an undersampling artifact or not.

Figure 4:
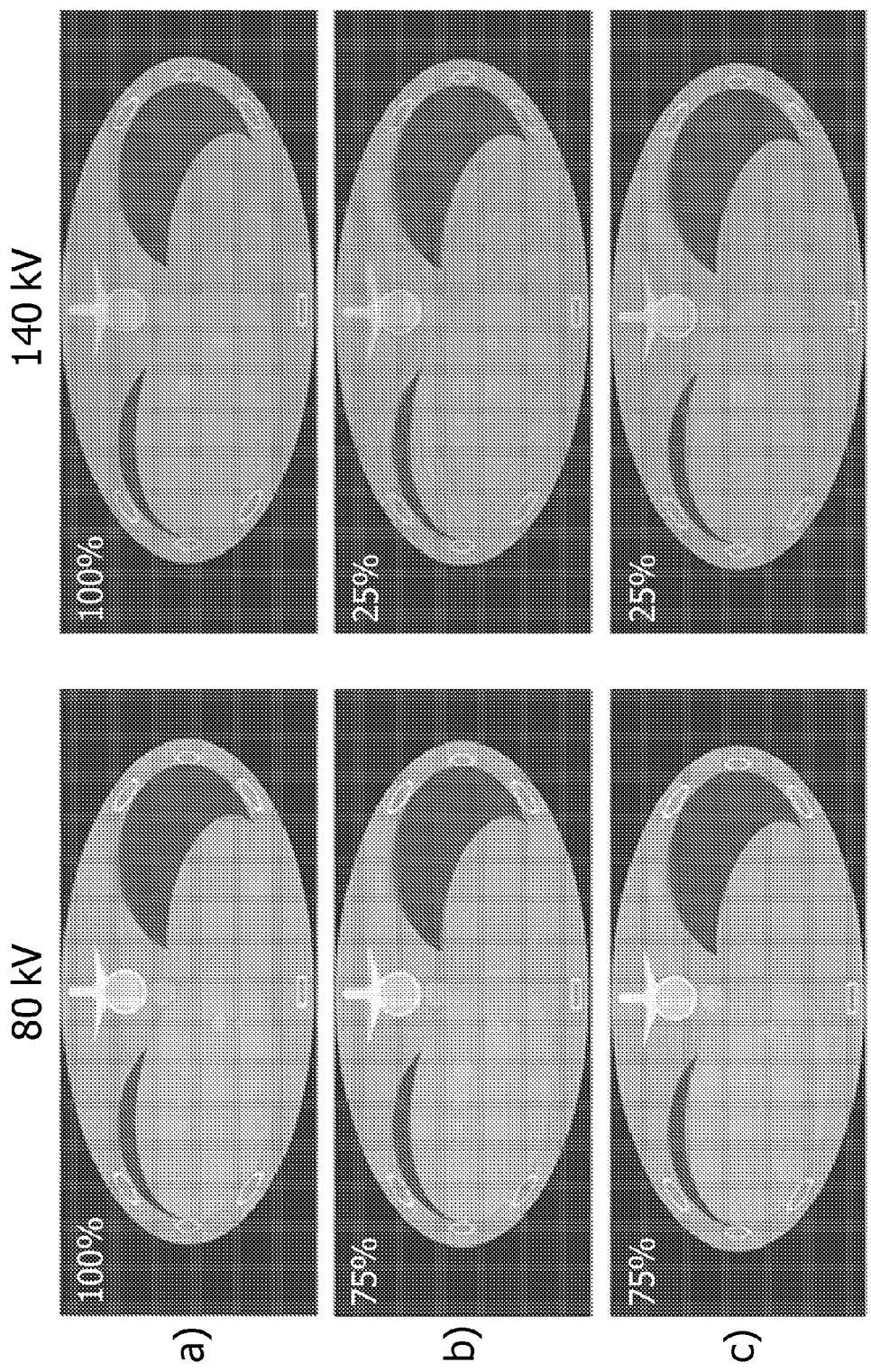
FIG. 4a-c show reconstructed image sets (left side: 80 kV; right side: 140 kV) from a simulation study on a thorax phantom; and The invention may take form in various components and arrangements of components, and in various process operations and arrangements of process operations. The drawings are only for the purpose of illustrating preferred embodiments and are not to be construed as limiting the invention.

The feasibility of the present invention is illustrated with a simulation study on a thorax phantom Reconstructed CT images resulting from this study are shown in FIG. 4 . CT projections were simulated for tube voltages of 80 kV (left column) and 140 kV (right column).

Row a) shows images obtained with complete (that is non-switched and non-interleaved) sets of projections. Since there is no undersampling in this case, no undersampling artifacts are present. Gradient locations in these images should therefore mostly represent actual 'edges' between different organs, bone, fluids and the like.

Row b) shows results for interleaved projections (75% of the projections from the 80 kV set and 25% from the 140 kV set). Artifacts, such as streaks and moiré patterns, occur due to undersampling. These artifacts introduce additional gradients in the images. Due to a higher undersampling ratio in the artifacts are more prominent in the 140 kV image.

Row c) shows images reconstructed with a common penalty function on the image gradients according to equation (2) using the same undersampled data that was used to reconstruct the images of row b). The artifacts were mostly removed, resulting in an image that is more reliable and of higher quality.

The method of the present invention might also be used to estimate a non-available (e.g. not measured, corrupted or otherwise missing) projection during or following reconstruction. This can be applied for reconstruction of basis materials for which the assumption of coincident-gradient locations is not fulfilled (e.g. spectral imaging of k-edge enhancing contrast agents, such as iodine) to facilitate reconstruction with a more complete set of data.

Although the invention is explained according to selected embodiments directed towards medical imaging, in particular CT, it is naturally not limited to these embodiments. On the contrary, a skilled person would recognize many variations and alternate embodiments within the scope of the invention. He would understand that the method and the system might also be suitable to other imaging fields as well, such as non-medical imaging (e.g. luggage scanning) or that other iterative or non-iterative methods may be used to match gradient locations.

The invention claimed is:

1. Method for reconstructing an image obtained from peak kilovoltage (kVp) switched imaging of a body, comprising a data processor for:
   acquiring a plurality of images at a first kVp defining a first image scan and a plurality of images at a second kVp defining a second image scan, wherein the plurality of images at the first kVp are acquired interleaved with the plurality of images of the second image scan;
   reconstructing an image from the first and second image scan, comprising
   determining at least one gradient location defining an edge between areas with lower and higher attenuation with respect to each other for at least one image in the first image scan and one image in the second image scan;
   determining divergent gradient locations for which the gradient locations do not coincide spatially in respect of a same part of the body for said at least one image in the first and second image scans;
   tagging each divergent gradient location as an undersampling artifact; and
   generating the reconstructed image from the at least two images in the first and second image scans by correcting for each tagged undersampling artifact.

2. The method according to claim 1, further comprising
   acquiring a plurality of images at a third kVp defining a third image scan, wherein the plurality of images at a third kVp is acquired interleaved with the plurality of images of the first and second image scans;
   reconstructing a reconstructed image from the first and second image scan, comprising
   determining at least one gradient location for at least two images in the third image scan;
   determining divergent gradient locations in respect of a same part of the body for said at least two images in the first, second image and third image scans;
   tagging each divergent gradient location as an undersampling artifact; and
   generating the reconstructed image from the at least two images in the first, second and third image scans by correcting for each tagged undersampling artifact.

3. The method according to claim 1, the reconstruction further comprising:
- determining a gradient amplitude at at least one divergent gradient location for at least one image scan of the same part of the body;
- determining divergent gradient amplitudes in respect of the same part of the body for said at least two images in the first and second image scans;
- untag undersampling artifacts when a gradient amplitude for a corresponding gradient location of the same part of the body is not divergent.

4. The method according to claim 1, wherein the step of determining of the at least one gradient location comprises using a common hyper-prior.

5. The method according to claim 1, wherein a non-present image from a part of the body is estimated.

6. An imaging system for imaging at least a part of a body, including
- a peak kilovoltage (kVp)-switched x-ray source generating x-rays at a first kVp and a second kVp;
- an x-ray detector for detecting x-rays generated at the first kVp and at the second kVp that have traversed an examination region;
- a data processor for causing the generation of image scans from x-rays detected by the detector;
- a reconstructor for
- determining gradient locations in images of said image scans;
- determining divergent gradient locations between said image scans;
- tagging divergent gradient locations as undersampling artifacts; and
- generating reconstructed images from said image scans by correcting for each tagged undersampling artifact; and
- a display unit for displaying the reconstructed images.

7. The system according to claim 6, further including
- a kVp-switched x-ray source generating x-rays at a third kVp; and
- an x-ray detector for detecting x-rays generated at the third kVp that have traversed an examination region.

8. The system according to claim 6, wherein the reconstructor comprises the data processor.

9. The system according to claim 6, the reconstructor is further for
- determining a gradient amplitude for at least one divergent gradient location;
- determining divergent amplitudes between said image scans;
- untagging undersampling artifacts when a gradient amplitude for a corresponding gradient location is not divergent.

10. The system according to claim 6 comprising a computed tomography apparatus.

11. A non-transitory computer readable storage medium encoded with computer readable instructions, which, when executed by the reconstructor according to claim 6, causes the reconstructor to:
- determine gradient locations between at least two image scans;
- determine divergent gradient locations between said at least two image scans;
- tag divergent gradient locations as undersampling artifacts; and
- generate reconstructed images from said image scans by correcting for each tagged undersampling artifact.

12. The computer program product stored on a non-transitory computer readable medium of claim 11 further comprising a set of instructions to cause a reconstructor to:
- determine a gradient amplitude for at least one divergent gradient location;
- determine divergent amplitudes between said image scans;
- untag undersampling artifacts when a gradient amplitude for a corresponding gradient location is not divergent.

* * * * *